(12) United States Patent
Guo et al.

(10) Patent No.: US 8,195,378 B2
(45) Date of Patent: Jun. 5, 2012

(54) EMISSIONS REDUCTIONS THROUGH MULTIPLE FUEL INJECTION EVENTS

(75) Inventors: Linsong Guo, Columbus, IN (US); Tim R. Frazier, Columbus, IN (US)

(73) Assignee: Cummins Inc., Columbus, IN (US)

( * ) Notice: Subject to any disclaimer, the term of this patent is extended or adjusted under 35 U.S.C. 154(b) by 659 days.

(21) Appl. No.: 12/321,428

(22) Filed: Jan. 21, 2009

(65) Prior Publication Data

US 2010/0023241 A1    Jan. 28, 2010

Related U.S. Application Data

(60) Provisional application No. 61/137,154, filed on Jul. 28, 2008.

(51) Int. Cl.
*F02D 43/00* (2006.01)
*F01N 3/20* (2006.01)
*G06F 19/00* (2006.01)

(52) U.S. Cl. ............ 701/104; 60/285; 60/295; 123/27 R

(58) Field of Classification Search ................ 123/27 R, 123/48 B, 51 A, 51 BB, 299, 300, 406.47; 60/274, 277, 285, 295, 299, 301, 303; 701/102–105, 701/107, 114–115
See application file for complete search history.

(56) References Cited

U.S. PATENT DOCUMENTS

| | | | |
|---|---|---|---|
| 5,479,775 A * | 1/1996 | Kraemer et al. ................ 60/274 |
| 6,082,325 A * | 7/2000 | Digeser et al. ................ 123/299 |
| 6,378,487 B1 * | 4/2002 | Zukouski et al. ............ 123/299 |
| 6,491,016 B1 | 12/2002 | Buratti |
| 6,666,020 B2 | 12/2003 | Tonetti et al. |
| 6,848,414 B2 | 2/2005 | West et al. |
| 6,901,747 B2 * | 6/2005 | Tashiro et al. ................. 60/286 |
| 6,935,303 B2 | 8/2005 | Eismark et al. |
| 6,948,476 B2 | 9/2005 | Gioannini et al. |
| 7,140,345 B2 | 11/2006 | Gioannini et al. |
| 7,213,565 B2 | 5/2007 | Grunaug et al. |
| 7,467,615 B2 * | 12/2008 | Siewert ........................ 123/299 |
| 7,513,239 B2 * | 4/2009 | Blessing et al. .............. 123/299 |
| 7,729,845 B2 * | 6/2010 | Iwashita et al. .............. 701/104 |
| 2003/0121249 A1 * | 7/2003 | Foster et al. .................... 60/285 |
| 2006/0016424 A1 | 1/2006 | Gioannini et al. |
| 2006/0242950 A1 * | 11/2006 | Wang et al. .................... 60/295 |
| 2007/0079798 A1 * | 4/2007 | Siewert ........................ 123/299 |
| 2008/0072872 A1 * | 3/2008 | Siewert ........................ 123/299 |
| 2008/0078167 A1 * | 4/2008 | Wang et al. .................... 60/285 |
| 2008/0148719 A1 | 6/2008 | Hermansson et al. |
| 2008/0294325 A1 * | 11/2008 | Kurotani et al. ............. 701/102 |

FOREIGN PATENT DOCUMENTS

| | | |
|---|---|---|
| EP | 1653069 A1 | 5/2006 |
| EP | 1582707 B1 | 1/2007 |

* cited by examiner

*Primary Examiner* — Willis Wolfe, Jr.
*Assistant Examiner* — Johnny Hoang
(74) *Attorney, Agent, or Firm* — Matt Fair; Krieg DeVault LLP; J. Stephen Wills

(57) ABSTRACT

A method is disclosed including operations to interpret an engine load level for a reciprocating piston internal combustion engine. In response to determining the engine load level is less than 40% of a maximum engine load level, the method further includes operations to performing a first fuel injection event including less than 25% of a combustion fuel amount, the first fuel injection event occurring before 10 degrees after top dead center (TDC), to perform a second fuel injection event including between 15% and 65% of the combustion fuel amount, the second fuel injection event occurring after 10 degrees after TDC, and to perform third fuel injection event comprising between 10% and 85% of the combustion fuel amount, the third fuel injection event occurring before 63 degrees after TDC.

28 Claims, 8 Drawing Sheets

US 8,195,378 B2

EMISSIONS REDUCTIONS THROUGH MULTIPLE FUEL INJECTION EVENTS

CROSS-REFERENCE TO RELATED APPLICATIONS

The present application claims the benefit of U.S. Provisional Patent Application No. 61/137,154 filed 28 Jul. 2008, which is hereby incorporated by reference in its entirety.

TECHNICAL FIELD

The technical field relates generally to $NO_x$ control in internal combustion engines, and more particularly relates to $NO_x$ control in reciprocating piston engines with common rail fuel injection.

BACKGROUND

Modern internal combustion engines must meet stringent emissions standards, including a maximum amount of nitrogen oxides ($NO_x$) that may be emitted. Many engines now utilize aftertreatment systems to reduce engine-out emissions to regulatory levels before release to the atmosphere. The process of regenerating the aftertreatment systems often introduces an increased emissions burden on the system, especially when regenerating certain types of aftertreatment components such as diesel particulate filter (DPF) and $NO_x$ adsorbers. Any increase of emissions during a regeneration event must be accounted for in the total emissions of the engine. Accordingly, there is a demand for further improvements in this area of technology.

SUMMARY

One embodiment is a unique fuel injection technique shifting at least a portion of the combustion fuel for injection to a later crank angle degree to reduce $NO_x$ generation during the combustion event. Other embodiments include unique methods, systems, and apparatus to reduce $NO_x$ emissions. Further embodiments, forms, objects, features, advantages, aspects, and benefits shall become apparent from the following description and drawings.

DESCRIPTION OF THE ILLUSTRATIVE EMBODIMENTS

Figure 1:
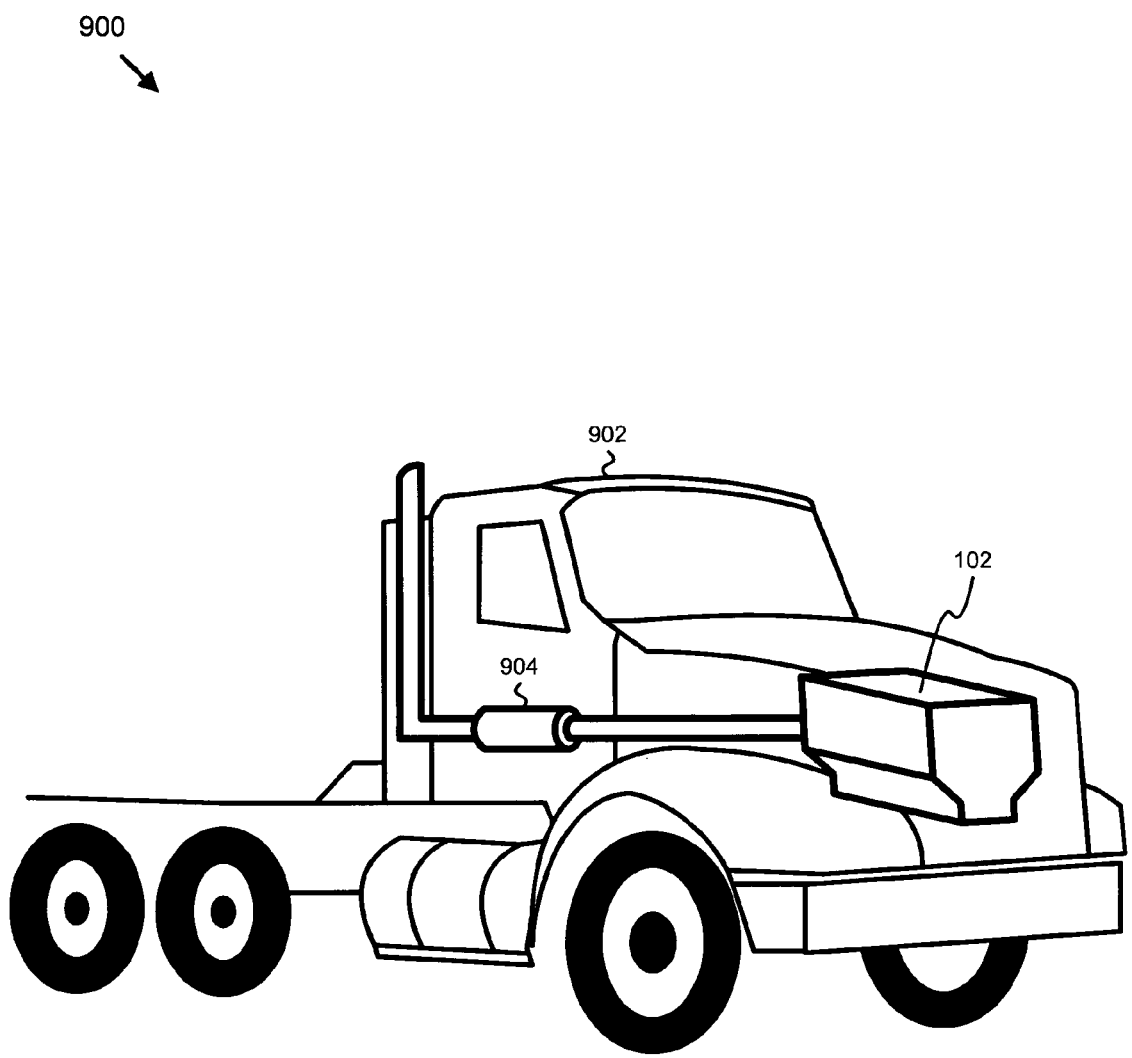
FIG. 1 is a schematic illustration of an application having a system for reducing $NO_x$ emissions.

While the present invention can take many different forms, for the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications of the described embodiments, and any further applications of the principles of the invention as described herein are contemplated as would normally occur to one skilled in the art to which the invention relates.

FIG. 1 is a schematic illustration of an application 900 having a system for reducing $NO_x$ emissions. The application 900 includes a vehicle 902 that carries an internal combustion engine 102 having one or more reciprocating pistons. The application 900 includes an aftertreatment system 904 that requires periodic regeneration events. The engine 102 includes fuel injectors and a processing subsystem that controls the fuel injectors and the power output of the engine 102.

Figure 2:
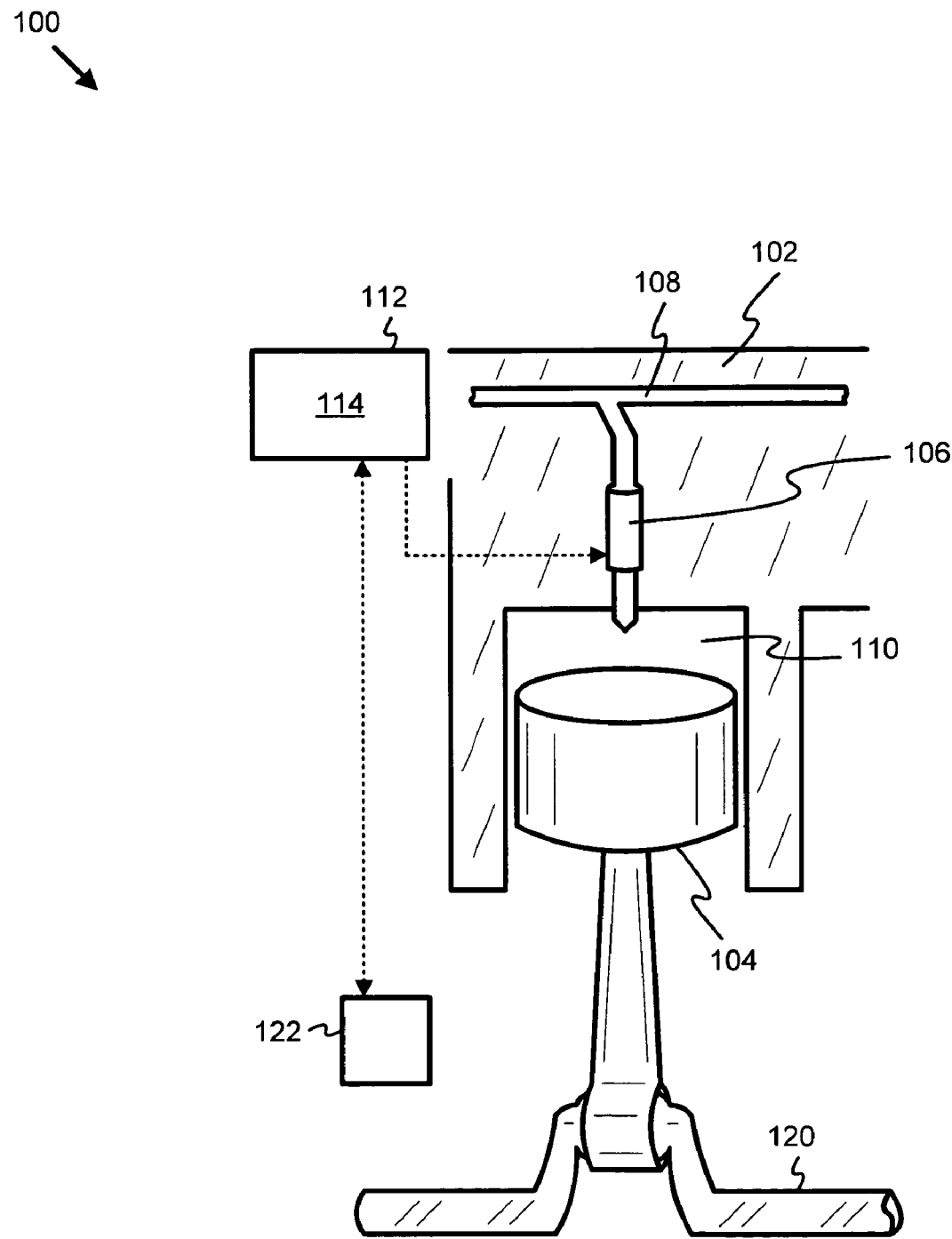
FIG. 2 is a schematic block diagram of a system for reducing $NO_x$ emissions.

FIG. 2 is a schematic block diagram of a system 100 for reducing $NO_x$ emissions. The system 100 includes an engine 102 having one or more reciprocating pistons 104. The engine 102 includes a fuel injector 106 capable of performing multiple fuel injection events to a combustion chamber 110 per one or two rotations of a crankshaft 120. For example, the fuel injector 106 in certain embodiments receives fuel from a pressurized common rail 108. While the engine 102 illustrated in FIG. 1 includes a high pressure common rail fuel injection system, the present application contemplates any apparatus capable of delivering multiple fuel injection events to the combustion chamber 110 of an engine 102 per rotation (or per two rotations) of the crankshaft 120. In certain embodiments, the system 100 includes an engine position sensor 122 that detects a current crankshaft 120 position.

The system 100 further includes a processing subsystem 112 including a controller 114. The processing subsystem 112 may be structured with controllers, modules, sensors, actuators, communication links, and other devices known in the art for performing the operations described herein. All commands and information may be provided in alternate forms, some information may not be present in certain embodiments, and additional information may be present in certain embodiments. Information may be interpreted from sensor inputs, from datalink communications, from parameters on a storage medium readable by a computer, or through other information gathering devices understood in the art.

In certain embodiments, the controller 114 is structured to interpret an engine load value, and to determine a first combustion amount and a second combustion amount in response to the engine load value. For example, the engine load value may be a requested engine torque output, and the controller 114 determines a first combustion amount and a second combustion amount such that the requested engine torque output is achieved. In another example, the engine load value may be a requested engine horsepower output, and the controller 114 determines a first combustion amount and a second combustion amount such that the requested engine horsepower output is achieved, taking into account a present speed of the engine 102. In certain embodiments, the engine load value is a value describing a percentage of a current maximum available torque value represented by a current requested engine torque. A maximum available torque value may be an overall maximum torque value or a maximum torque value at a current engine speed. Any value understood in the art as an engine load value is contemplated in the present application.

In certain embodiments, the first combustion amount is injected as one or more main injection events, and the second combustion amount is injected as one or more post-injection events. In certain embodiments, the one or more post-injection events begin before 63 degrees after top dead center (TDC). In certain embodiments, the controller 114 is further structured to determine the first combustion amount as less than 60% of a combustion fuel amount, where the first combustion amount and the second combustion amount together include a total amount of fuel contributing to combustion and injected within a single combustion stroke. In certain embodiments, the total amount of fuel contributing to combustion include the fuel amounts that burn in the combustion chamber 110 and contribute to the torque output of the engine 102. In certain embodiments, the fuel injector 106 delivers the first combustion amount before 10 degrees after TDC of the piston 104, and delivers the second combustion amount after 10 degrees after TDC.

Depending upon the characteristics of the fuel system, the terms delivery of fuel, injection of fuel, and/or performing a fuel injection event at a specified crank angle degree indicate that the fueling event or start-of-injection (SOI) begins at the specified crank angle degree. For example, delivery before 10 degrees after TDC generally indicates an SOI before 10 degrees after TDC. However, embodiments wherein delivery before 10 degrees after TDC indicates completion of an injection event before 10 degrees after TDC are also contemplated herein except where otherwise stated. The differences between the naming conventions are small for most fuel systems.

In certain embodiments, the first combustion amount comprises less than 25% of the combustion fuel amount in response to the engine load value having a value less than a threshold value, which may be a threshold percentage of a maximum engine load level. In certain embodiments, the threshold percentage includes between about 30% and 40% of the maximum engine load value. In certain further embodiments, the first combustion amount comprises less than 50% of the combustion fuel amount in response to the engine load value at least equal to the threshold value. For example, in certain embodiments of the system 100, the fuel injector 106 injects a low amount of fuel in a "main" injection in response to a low engine load value, and injects a greater amount of fuel, but less than 60%, in a "main" injection in response to a higher engine load value.

In certain embodiments, a first fuel injection event and a second fuel injection event are injected as approximately equal amounts of fuel. In certain further embodiments, the first fuel injection event and the second fuel injection event are injected as approximately equal amounts of fuel in response to the engine load value having a value at least equal to a threshold value. For example, if the combustion fuel amount is 100 units of fuel and the engine load value is greater than the threshold value, the first combustion amount may be 30% of the combustion fuel amount and injected as a first injection event including 30 units of fuel. The second combustion amount may be 30% of the combustion fuel amount, and injected as a second injection event including 30 units of fuel, and further as one or more later injection events adding up to 40 units of fuel. In certain further embodiments, the first injection event and the second injection event may have a ratio varying within a range of about 3:7 to 7:3, providing fueling amounts for the first:second:later injection events between about 30:70:0 units of fuel respectively to about 30:13:57 units of fuel respectively. Note that, in applicable embodiments, even if the first:second ratio is as high as 7:3, the overall percentage of fuel in the first injection event compared to the combustion fuel amount is maintained. In certain embodiments, including any loading values but especially engine load values below the threshold value, there may be no relationship enforced between a first and second fuel injection event.

In certain embodiments, each fuel injection event within the first combustion amount and the second combustion amount occurs not earlier than 3 crank angle degrees after the prior fuel injection event. In certain embodiments, limitations of a fueling system may require longer delays such as between about 5 and 10 crank angle degrees between injection events. In certain further embodiments, limitations of continuing the combustion event require no greater than a maximum time between fuel injection events. In many situations, it is a straightforward matter to plot expected heat release versus observed heat release in a test cell to determine how far apart injection events may occur and still continue the combustion event. The time separation possible between events depends upon the crank angle positions of the injection events (e.g. temperature in the combustion chamber is changing more rapidly with respect to time away from TDC than near TDC), the engine speed, the engine loading value, and other factors understood in the art. Generally, injection events later than 63 degrees after TDC, which may be termed very late post injections, may exhibit some torque effects (i.e. combust partially) but generally such injections do not participate in the combustion event, and therefore generate primarily unburned hydrocarbons (UHC) rather than torque.

In certain embodiments, the controller 114 is structured to determine whether an aftertreatment (not shown) regeneration is active, and to implement a standard fueling scheme in response to the aftertreatment regeneration not being active. For example, the system 100 may include a particulate filter requiring periodic regeneration events. The controller 114 in the example determines whether a regeneration event of the particulate filter is active, and implements a first and second combustion fuel amount if the regeneration event is active, and a standard fueling scheme if the regeneration event is not active. In certain embodiments, the controller 114 is structured to utilize first and second combustion fuel amounts at all operating times of the engine 102. In certain embodiments, the controller 114 is structured to utilize a greater amount of the second combustion fuel amount during an active regeneration event, and to utilize a greater amount of the first combustion fuel amount during periods where a regeneration event is not active.

Figure 3:
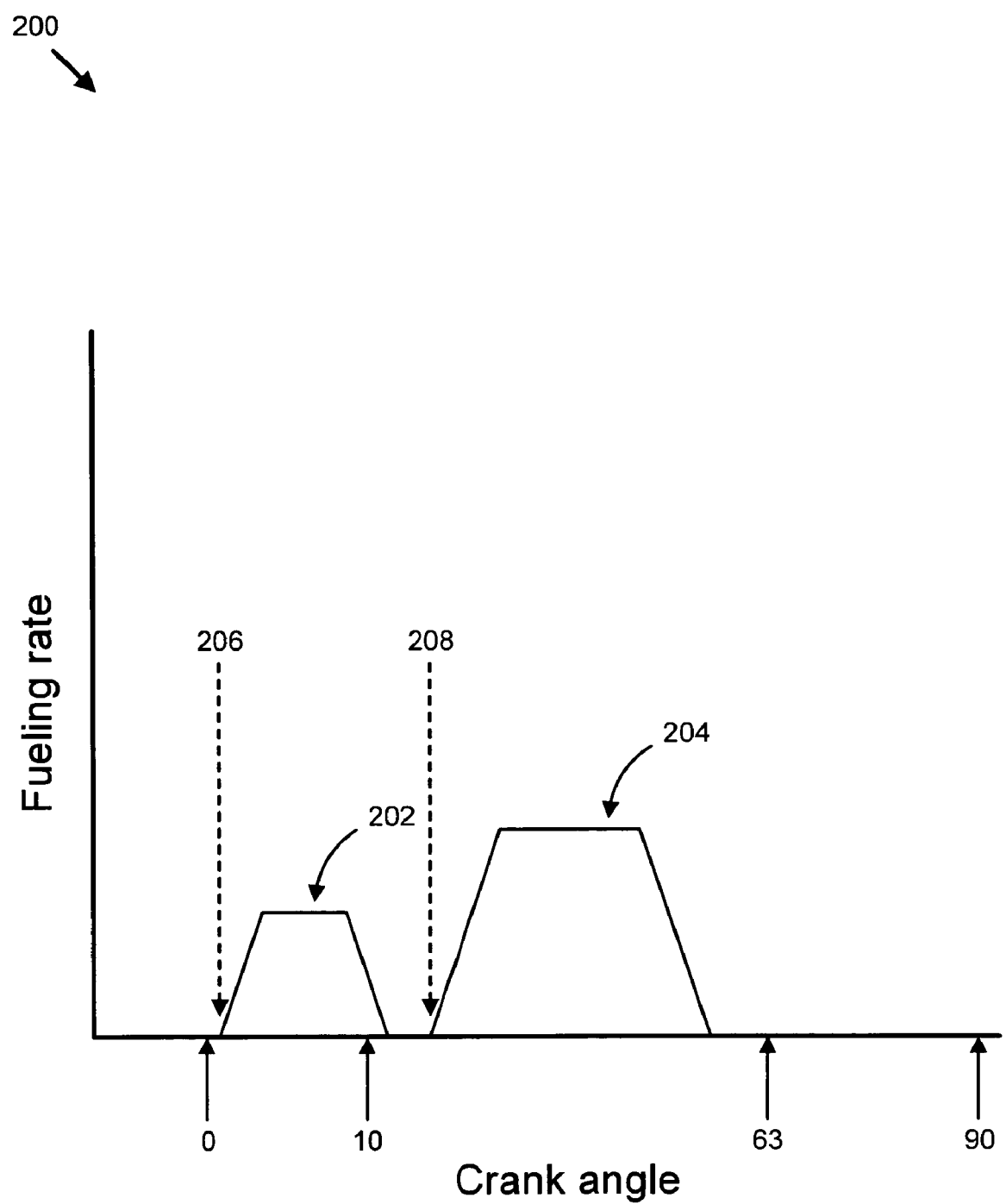
FIG. 3 is an illustration of a plurality of fuel injection events.

FIG. 3 is an illustration 200 of a plurality of fuel injection events. The illustration 200 shows a first fuel injection event 202 and a second fuel injection event 204. The amount of fuel injected during the first fuel injection event 202 comprises one or more than one main injection combustion fuel amount and the amount of fuel injected during the second fuel injection event 204 comprises the one or more than one post injection combustion fuel amount. In certain embodiments, the first combustion fuel amount has an SOI 206 before 10 degrees after TDC, and the second combustion fuel amount has an SOI 208 after 10 degrees after TDC, and before 63 degrees after TDC. Further, the second combustion fuel amount is larger than the first combustion fuel amount.

In certain embodiments, a combustion fuel amount is divided between the first fuel injection event 202 and the second fuel injection event 204. A controller 114 interprets an engine torque output request, and adjusts the combustion fuel amount based on the timing and fuel amounts of the fuel injection events 202, 204 such that the engine 102 achieves the engine torque output request. The fuel adjustment operations of the controller 114 may be utilized in any embodiments, but may be especially useful in embodiments where the second combustion fuel amounts occur in special operations of the engine 102 such as during an aftertreatment regeneration event.

For example, an engine torque output request may be 250 ft-lbs of torque, and during nominal operation of the engine 102, 100 units of fuel in the combustion fuel amount may be required to achieve the 250 ft-lbs of torque. In the example, during an aftertreatment regeneration event the controller 114 implements a first combustion amount and a second combustion amount, and divides a portion of the combustion fuel amount into each of the first and second combustion amounts. The controller 114 may be further structured to calculate an effective torque according to the fuel amounts and timing of the early and second combustion amounts, and to adjust the combustion fuel amount to achieve the engine torque output request. In the example, after the controller 114 puts 40 units of fuel into the first combustion amount and 60 units of fuel into the second combustion amount, the controller 114 may determine that only 235 ft-lbs of torque will be achieved due to more of the combustion fuel amount being combusted away from TDC. The controller 114 may adjust the combustion fuel amount until 250 ft-lbs will be achieved, for example increasing the first combustion amount to 42 units of fuel and the second combustion amount to 64 units of fuel.

The controller 114 may adjust fueling by any method, including without limitation: proportionately across fuel injection events, favoring the first combustion amount or the second combustion amount, increasing one of the first combustion amount or the second combustion amount until a threshold is reached and putting remaining increases in the other combustion amount, or by any other fuel adjustment method understood in the art. In certain embodiments, a nominal fuel controller (not shown, but may be part of the processing subsystem 112 and/or controller 114) may be designed to account for torque effects of the timing of the first combustion amount and the second combustion amount, and later adjustments by the controller 114 may be unnecessary.

Figure 4:
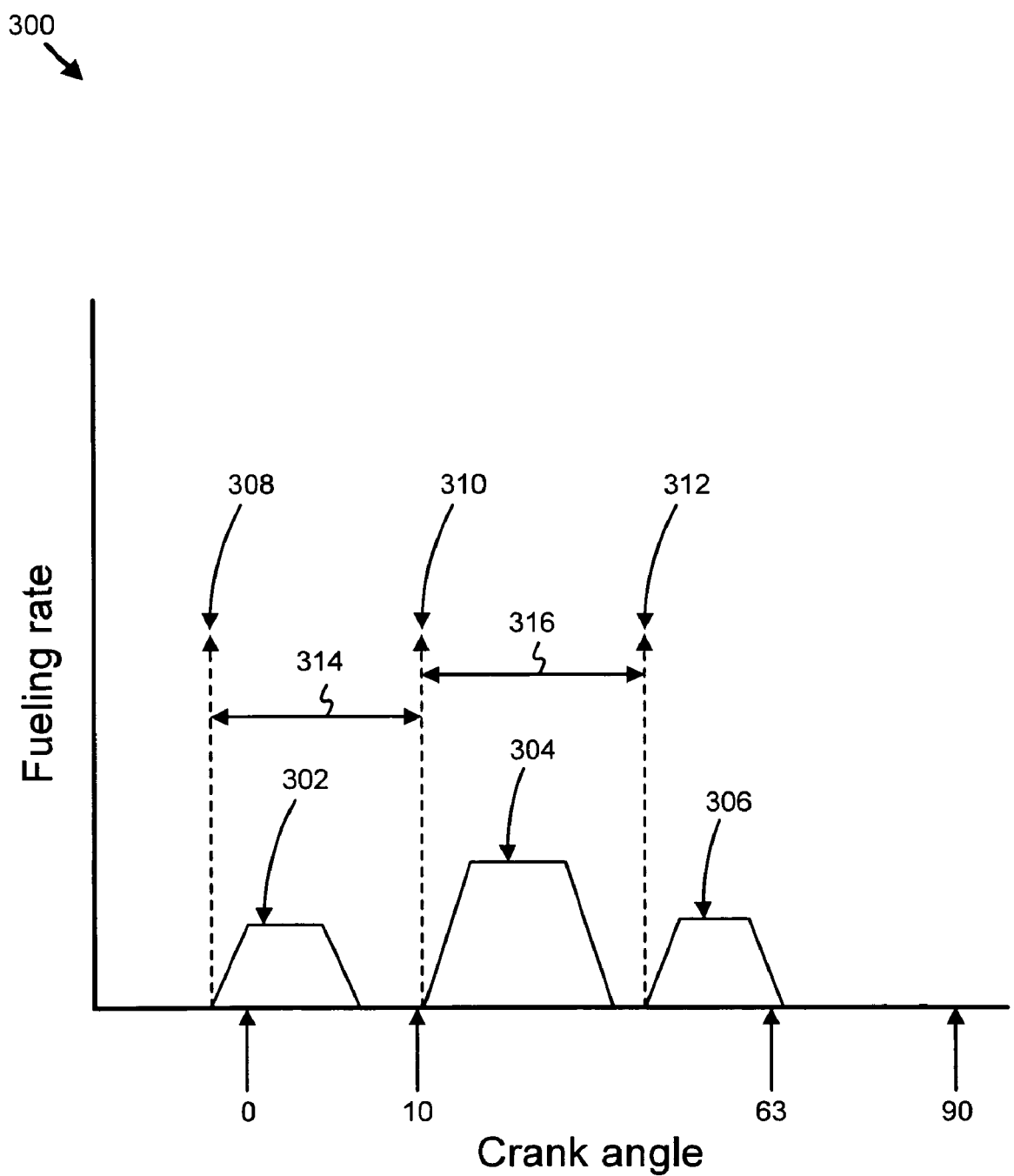
FIG. 4 is an illustration of a plurality of fuel injection events.

FIG. 4 is an illustration 300 of a plurality of fuel injection events. The illustration 300 shows a first fuel injection event 202, a second fuel injection event 304, and a third fuel injection event 306. The amount of fuel injected during the first fuel injection event 302 comprises the first combustion fuel amount. The sum of the amounts of fuel injected in the second and third injection events 304, 306 comprises the second and third combustion fuel amounts.

The first combustion fuel amount has an SOI 308 before 10 degrees after TDC. Each of the injection events 304, 306 comprising the second and third combustion fuel amounts have an SOI 310, 312 after 10 degrees after TDC and before 63 degrees after TDC. In certain embodiments, a first distance 314 between the first SOI 308 and the second SOI 310 is greater than 3 crank angle degrees. Each of the fuel injection events 302, 304, 306 contributes to combustion and is injected within a single combustion stroke. In the illustration 300 of FIG. 3, the first injection event 302 includes less than 25% of a combustion fuel amount, where the combustion fuel amount is the sum of the first, second, and third combustion fuel amounts. In certain embodiments, a very late post injection event (not shown) may be included, for example to provide unburned hydrocarbons to an aftertreatment system. Very late post injections do not contribute to combustion.

Figure 5:
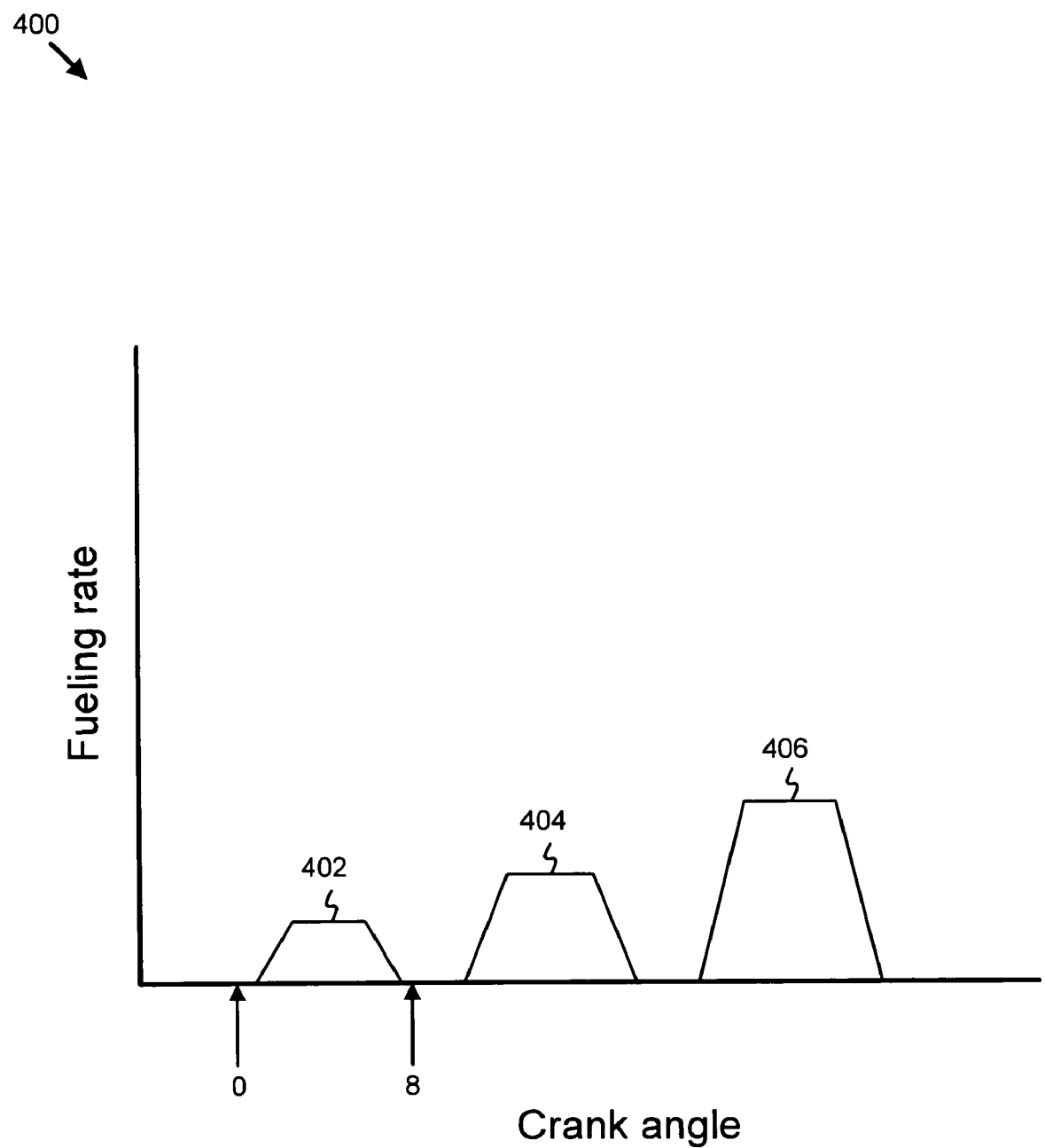
FIG. 5 is an illustration of a plurality of fuel injection events.

FIG. 5 is an illustration 400 of a plurality of fuel injection events. In certain embodiments, the system 100 performs the fuel injection events of the illustration 400 in response to determining an engine load level is less than 40% of a maximum engine load level. In the illustration 400, a first fuel injection event 402 includes less than 25% of a combustion fuel amount and has an SOI before 10 degrees after TDC. A second fuel injection event 404 includes between 15% and 65% of the combustion fuel amount, and has an SOI after 10 degrees after TDC. A third fuel injection event 406 includes between 10% and 85% of the combustion fuel amount, and occurs at least 3 crank angle degrees after the second fuel injection event 404 and before 63 degrees after TDC. In certain embodiments, each fuel injection event 402, 404, 406 takes part in the actual combustion of the fuel.

Figure 6:
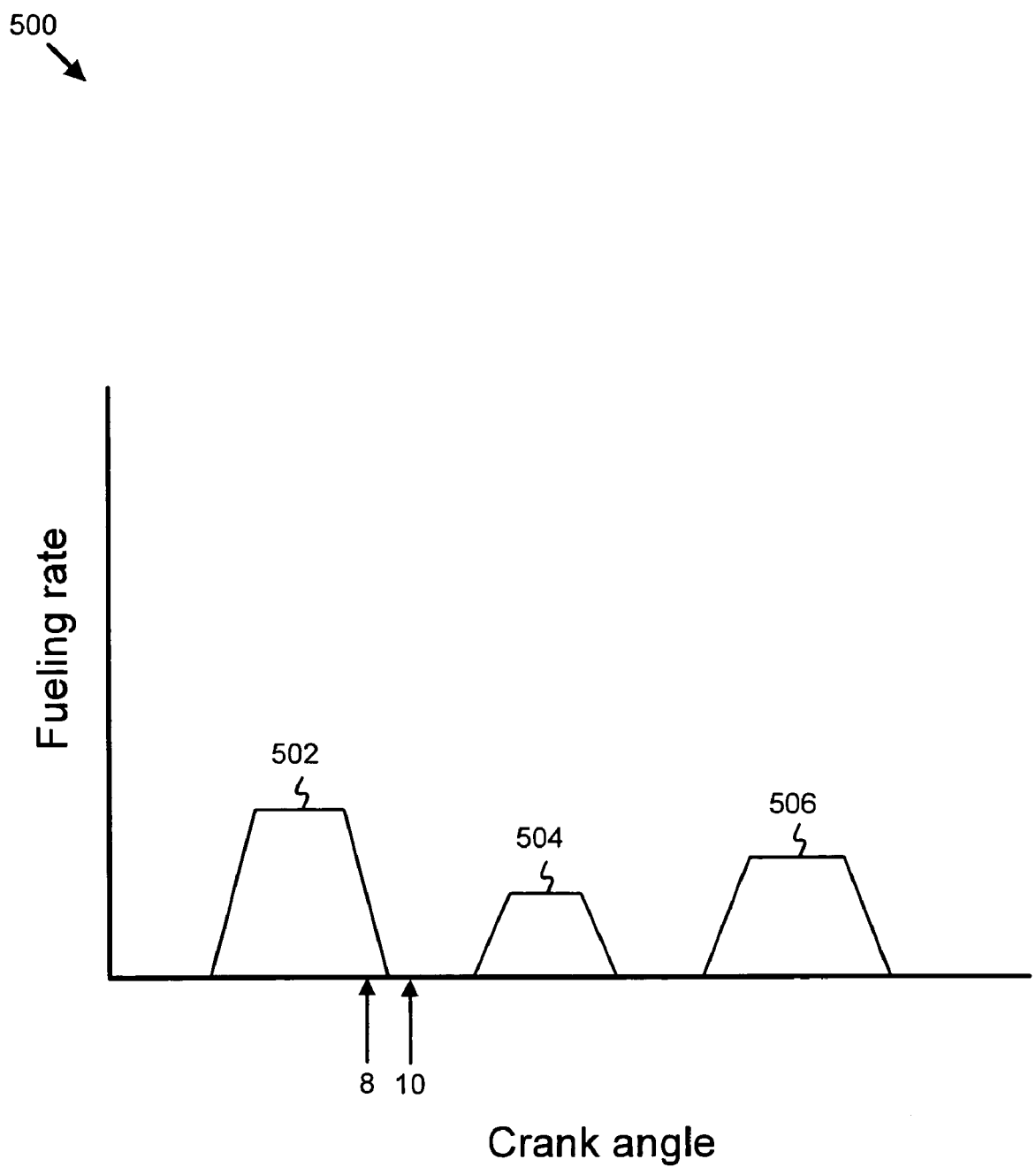
FIG. 6 is an illustration of a plurality of fuel injection events.

FIG. 6 is an illustration 500 of a plurality of fuel injection events. In certain embodiments, the system 100 performs the fuel injection events of the illustration 500 in response to determining an engine load level is at least equal to a threshold percentage (e.g. 40%) of a maximum engine load level. In certain embodiments, the fuel injection events of the illustration 500 occur on the same system 100 as the fuel injection events of the illustration 400.

For clarity in naming the fuel injection events, the fuel injection events of the illustration 400 are named a first fuel injection event 402, a second fuel injection event 404, and a third fuel injection event 406, while the fuel injection events of the illustration 500 are named a fourth fuel injection event 502, a fifth fuel injection event 504, and a sixth fuel injection event 506. However, only one set of the fuel injection events, the first-second-third fuel injection events or the fourth-fifth-sixth fuel injection events, are executed on a given combustion cycle of the engine 102 in the example. A given system 100 may include the fuel injection events of the illustration 400, the fuel injection events of the illustration 500, or both sets of fuel injection events at varying engine operating conditions. Further, certain embodiments may not include the injection events from either the illustration 400 or the illustration 500, and/or may include additional injection events not shown in the illustrations 400, 500.

In the illustration 500, a fourth fuel injection event 502 includes less than 60% of a combustion fuel amount and has an SOI before 8 degrees after TDC. A fifth fuel injection event 504 includes between 5% and 45% of the combustion fuel amount, and has an SOI after 10 degrees after TDC. A sixth fuel injection event 506 includes between 5% and 55% of the combustion fuel amount, and occurs at least 3 crank angle degrees after the fifth fuel injection event 504 and before 63 degrees after TDC. Each fuel injection event 502, 504, 506 takes part in the actual combustion of the fuel. In certain embodiments, the fifth fuel injection event 504 occurs not later than 2.8 milliseconds after the fourth fuel injection event.

Figure 7:
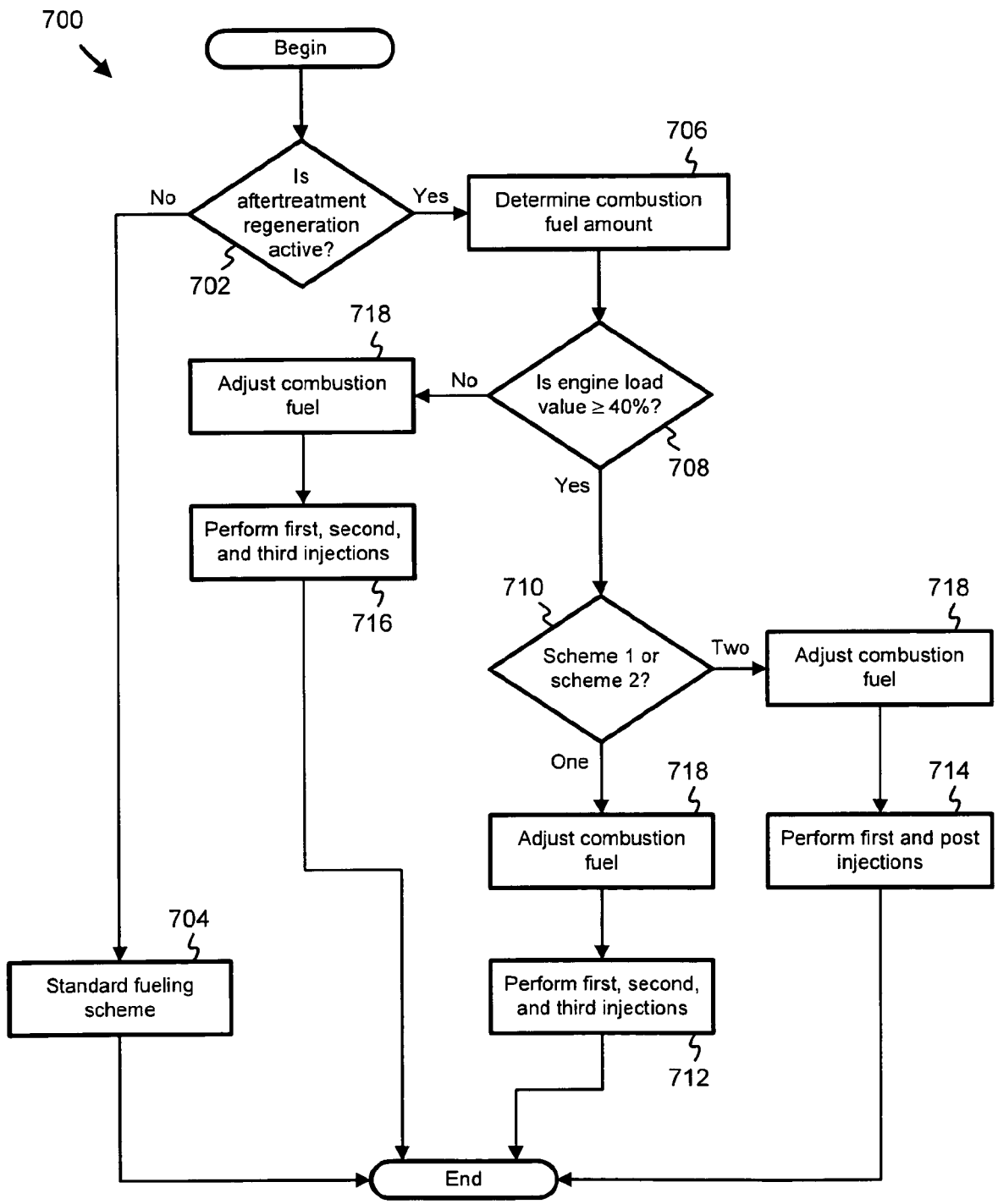
FIG. 7 is a schematic flow diagram illustrating a technique for reducing $NO_x$ emissions.

FIG. 7 is a schematic flow diagram illustrating a technique 700 for reducing $NO_x$ emissions. The technique 700 includes an operation 702 to determine whether an aftertreatment regeneration is active. In response to the aftertreatment regeneration is not active, the technique 700 includes an operation 704 to implement a standard fueling scheme.

In response to the aftertreatment regeneration being active, the technique 700 includes an operation 706 to determine a combustion fuel amount for an engine 102 having at least one piston. The technique 700 further includes an operation 708 to determine whether an engine load level exceeds 40% of a maximum engine load level. In response to the engine load level being at least equal to 40% of the maximum engine load level, the technique 700 further includes an operation 710 to check whether a first injection scheme or second injection scheme is utilized.

When the first injection scheme is utilized, the technique 700 includes an operation 712 to perform a first fuel injection event before 10 degrees after TDC including less than 50% of the combustion fuel amount, a second fuel injection event after 10 degrees after TDC including 5% to 45% of the combustion fuel amount, and a third fuel injection event after the second fuel injection event including 5% to 55% of the combustion fuel amounts. When the second injection scheme is utilized, the technique 700 includes an operation 714 to perform a first fuel injection event before 10 degrees after TDC including less than 50% of the combustion fuel amount, and at least one post injection, each occurring after 10 degrees after TDC and the sum of the post injection event fueling amounts including over 50% of the combustion fuel amount.

The first and second injection schemes represent examples of injection schemes under the present application to reduce emissions, and generally represent a framework for organizing fueling controls. A given embodiment may utilize the first injection scheme, the second injection scheme, and/or other injection schemes consistent with the disclosures herein. The selection of an injection scheme need not be exclusive—for example an embodiment may utilize the second injection scheme with parameters providing fuel injection events consistent with an embodiment of the first injection scheme.

In response to the engine load level being less than 40% of the maximum engine load level, the technique further includes an operation 716 to perform a first fuel injection before 8 degrees after TDC including less than 25% of the combustion fuel amount, a second fuel injection event after 10 degrees after TDC including between 15% and 65% of the combustion fuel amount, and a third fuel injection event occurring after the second fuel injection event including between 10% and 85% of the combustion fuel amount.

In certain embodiments, the technique 700 includes an operation 718 to determine an engine torque output request, and to adjust the combustion fuel amount based on the timing and fueling amounts of a plurality of fuel injections such that the engine 102 achieves the engine torque output request. The operation 718 is performed according to the fuel injection scheme for the technique 700, and occurs between determining the fueling and timing for each injection event and performing each fuel injection event.

Certain operations of FIG. 7 may be omitted in whole or part, certain operations not shown in FIG. 7 may be added, and operations may be performed in a different order or performed in an alternate manner.

Figure 8:
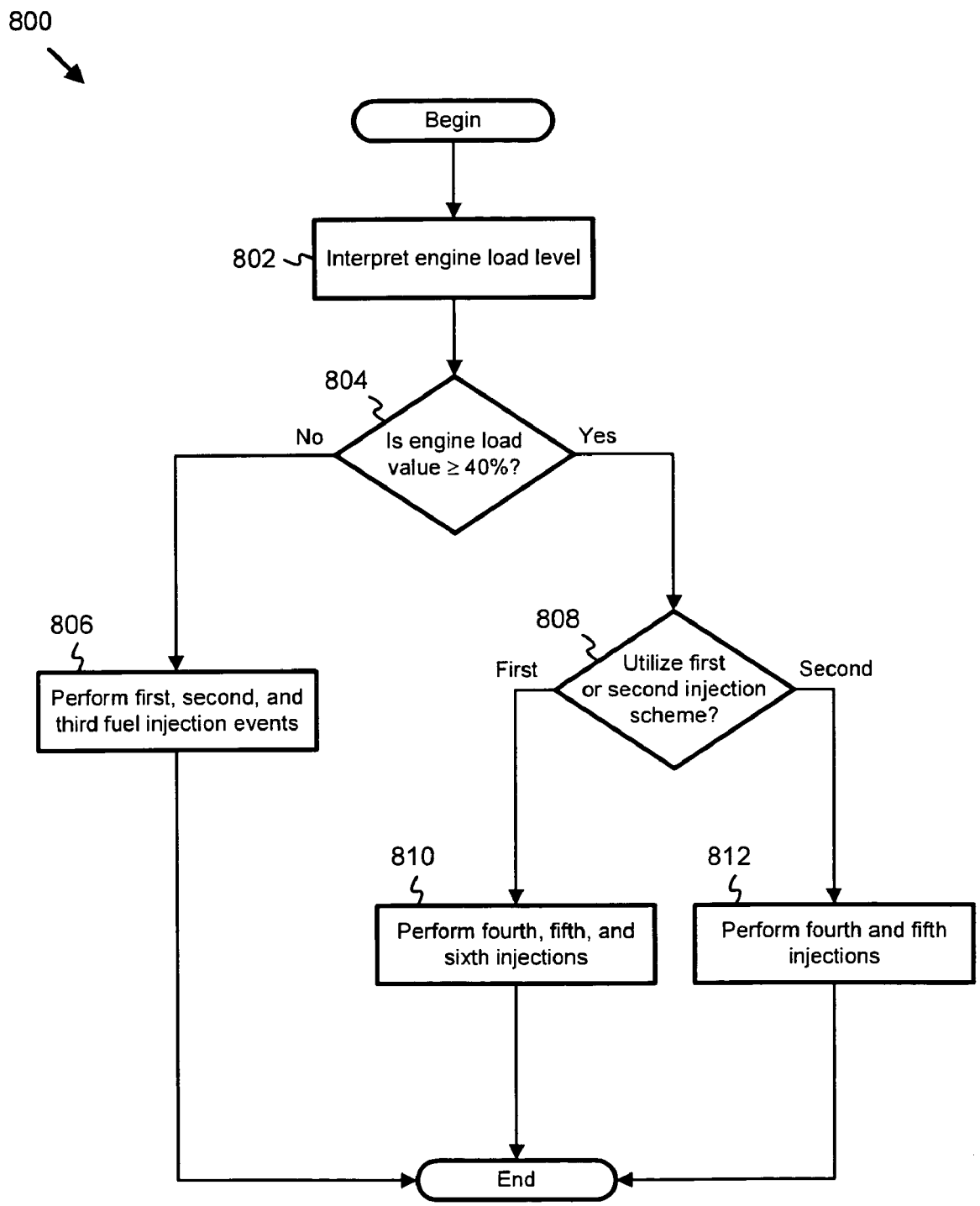
FIG. 8 is a schematic flow diagram illustrating an alternate technique for reducing $NO_x$ emissions.

FIG. 8 is a schematic flow diagram illustrating an alternate technique 800 for reducing $NO_x$ emissions. The technique 800 includes an operation 802 to interpret an engine load level for an engine 102 having at least one piston. The technique 800 further includes an operation 804 to determine whether the engine load level is less than a threshold percentage (40% in the example of FIG. 8) of a maximum engine load level. In certain embodiments the threshold percentage may be between about 30%-40%, or other values that provide $NO_x$ generation benefit but minimize interference and fuel economy penalties that may be experienced with loaded engine operation. In response to determining the engine load level is less than 40% of a maximum engine load level, the technique 800 includes an operation 806 to perform a first fuel injection event before 10 degrees after TDC including less than 25% of a combustion fuel amount, a second fuel injection event after 10 degrees after TDC including 15% to 65% of the combustion fuel amount, and a third fuel injection event after the second fuel injection event and before 63 degrees after TDC including between 10% to 85% of the combustion fuel amount.

In response to determining the engine load level is equal to or greater than 40% of the maximum engine load level, the technique 800 includes an operation 808 to check whether a first injection scheme or second injection scheme is utilized.

When the first injection scheme is utilized, the technique 800 includes an operation 810 to perform a fourth fuel injection event before 8 degrees after TDC including not more than 60% of the combustion fuel amount, a fifth fuel injection event after 10 degrees after TDC including 5% of 45% of the combustion fuel amount, and a sixth fuel injection event at least 3 degrees after the fifth fuel injection event and before 63 degrees after TDC including 5% to 55% of the combustion fuel amount. When the second injection scheme is utilized, the technique 800 includes an operation 812 to perform a fourth fuel injection event before 10 degrees after TDC and including less than 60% of the combustion fuel amount, and a fifth fuel injection event after 10 degrees after TDC.

Certain operations of FIG. 8 may be omitted in whole or part, certain operations not shown in FIG. 8 may be added, and operations may be performed in a different order or performed in an alternate manner.

As is evident from the figures and text presented above, a variety of embodiments according to the present invention are contemplated.

One exemplary embodiment is a method including operations to determine whether an aftertreatment regeneration is active, to determine a combustion fuel amount for an internal combustion engine including reciprocating pistons, and to inject the combustion fuel amount within a combustion cycle such that over 50% of the combustion fuel amount is injected more than 10 degrees after TDC of the reciprocating pistons in response to the aftertreatment regeneration being active. The combustion fuel is combusted during the combustion cycle. In certain embodiments, injecting the combustion fuel amount includes performing a plurality of fuel injection events in the internal combustion engine, where each of the plurality of fuel injection events begin no later than 63 degrees after TDC.

In certain further embodiments, the method includes operations to determine an engine torque output request, and to adjust the combustion fuel amount based on the timing and fuel amounts of the plurality of fuel injection events such that the internal combustion engine achieves the engine torque output request.

In certain embodiments, the first fuel injection event occurs before 8 degrees after TDC, and each subsequent fuel injection event occurs not earlier than 3 crank angle degrees after each preceding fuel injection event. In certain further embodiments, each of the fuel injection events takes part in the actual combustion of the fuel.

In certain embodiments, the method includes operations to interpret an engine load level. In response to determining the engine load level is less than 40% of a maximum engine load level, the method further includes operations to perform a first fuel injection event before 8 degrees after TDC, a second fuel injection event after 10 degrees after TDC, and a third fuel injection event after the second fuel injection event. The first fuel injection event includes less than 25% of the combustion fuel amount, the second fuel injection event includes between 15% and 65% of the combustion fuel amount, and the third fuel injection event includes between 10% and 85% of the combustion fuel amount. In certain further embodiments, the engine load level includes one of an engine torque output request and an engine horsepower output request.

In certain further embodiments, the method includes operations, in response to determining the engine load level is at least equal to 40% of a maximum engine load level, to perform a first fuel injection event before 8 degrees after TDC, a second fuel injection event after 10 degrees after TDC, and a third fuel injection event after the second fuel injection event. The first fuel injection event includes less than 50% of the combustion fuel amount, the second fuel injection event includes between 5% and 45% of the combustion fuel amount, and the third fuel injection event includes between 5% and 55% of the combustion fuel amount.

In certain further embodiments, the method includes operations, in response to determining the engine load level is at least equal to 40% of a maximum engine load level, to perform a first fuel injection event before 10 degrees after TDC, and at least one post fuel injection event after 10 degrees after TDC. The first fuel injection event includes less than 50% of the combustion fuel amount, and the sum of fueling amounts from the post fuel injection events comprises over 50% of the combustion fuel amount.

In one exemplary embodiment, a method includes operations to interpret an engine load level for a reciprocating piston internal combustion engine, and in response to determining the engine load level is less than 40% of a maximum engine load level, to perform a first fuel injection event comprising less than 25% of a combustion fuel amount, the first fuel injection event occurring before 8 degrees after top dead center (TDC), to perform a second fuel injection event comprising between 15% and 65% of the combustion fuel amount, the second fuel injection event occurring after 10 degrees after TDC, and to perform a third fuel injection event comprising between 10% and 85% of the combustion fuel amount, the third fuel injection event occurring at least 3 degrees after the second injection event and before 63 degrees after TDC. In certain embodiments, the fuel injected in each fuel injection event takes part in the actual combustion of the fuel. In certain embodiments, each of the second and third fuel injection events follows the preceding fuel injection event by not less than 3 crank angle degrees and by not more than 2.8 milliseconds.

In certain further embodiments, the method includes operations, in response to determining the engine load level is at least equal to 40% of the maximum engine load level, to perform a fourth fuel injection event comprising not more than 50% of a combustion fuel amount, the fourth fuel injection event occurring before 8 degrees after top dead center (TDC), to perform a fifth fuel injection event comprising between 5% and 45% of the combustion fuel amount, the fifth fuel injection event occurring after 10 degrees after TDC, and to perform a sixth fuel injection event comprising between 5% and 55% of the combustion fuel amount, the sixth fuel injection event occurring at least 3 degrees after the fourth fuel injection event and before 63 degrees after TDC.

In certain further embodiments, the method includes operations, in response to determining the engine load level is at least equal to 40% of the maximum engine load level, to perform a fourth fuel injection event and a fifth fuel injection event, wherein the fourth fuel injection event comprises less than 50% of the combustion fuel amount and occurs before 10 degrees after TDC, and wherein the fifth fuel injection event occurs after 10 degrees after TDC.

In one exemplary embodiment, a system includes a reciprocating piston internal combustion engine, and a controller structured to interpret an engine load value, and to determine a first combustion amount and a second combustion amount in response to the engine load value. In certain embodiments, the first combustion amount includes less than 50% of a combustion fuel amount, and the first combustion amount and the second combustion amount include a total amount of fuel contributing to combustion and injected within a single combustion stroke. In certain further embodiments, the system includes a fuel injection means that delivers the first combustion amount before 10 degrees after TDC and injects the second combustion amount after 10 degrees after TDC. In certain further embodiments, the fuel injection means includes a common rail fuel system, wherein the first combustion amount is injected as at least one main fuel injection, and wherein the second combustion amount is injected as at least one post fuel injection.

In certain further embodiments, the first combustion amount includes less than 25% of the combustion fuel amount in response to the engine load value having a value less than 40% of a maximum engine load value. In certain further embodiments, the first combustion amount includes less than 50% of the combustion fuel amount in response to the engine load value having a value at least equal to 40% of the maximum engine load value. In certain further embodiments, the last of the at least one post fuel injections begins before 63 degrees after TDC. In certain further embodiments, each fuel injection event after a first fuel injection event is performed not earlier than 3 crank angle degrees after a previous fuel injection event. In certain further embodiments, the controller is further structured to determine whether an aftertreatment regeneration is active, and to implement a standard fueling scheme in response to the aftertreatment regeneration not being active.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred, more preferred or exemplary utilized in the description above indicate that the feature so described may be more desirable or characteristic, nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
   determining whether an aftertreatment regeneration is active;
   determining a combustion fuel amount for an internal combustion engine including one or more reciprocating pistons;
   injecting the combustion fuel amount within a combustion cycle such that over 50% of the combustion fuel amount is injected more than 10 degrees after top dead center (TDC) of the one or more reciprocating pistons in response to the aftertreatment regeneration being active;
   combusting the combustion fuel amount during the combustion cycle;
   wherein injecting the combustion fuel amount comprises performing a plurality of fuel injection events in the internal combustion engine, wherein each of the plurality of fuel injection events begin no later than 63 degrees after TDC;
   interpreting an engine load level, and in response to determining the engine load level is less than 40% of a maximum engine load level: performing a first fuel injection event before 10 degrees after TDC comprising less than 25% of the combustion fuel amount, performing a second fuel injection event after 10 degrees after TDC comprising between 15% and 65% of the combustion fuel amount, and performing a third fuel injection event after the second fuel injection event comprising between 10% and 85% of the combustion fuel amount.

2. The method of claim 1, further comprising determining an engine torque output request, and adjusting the combustion fuel amount based on the timing and fuel amounts of the plurality of fuel injection events such that the internal combustion engine achieves the engine torque output request.

3. The method of claim 1, wherein the second fuel injection event occurs not earlier than 3 crank angle degrees after the first fuel injection event.

4. The method of claim 1, wherein the first fuel injection event occurs before 8 degrees after TDC, and wherein the second fuel injection event occurs not earlier than 3 crank angle degrees after the first fuel injection event.

5. The method of claim 1, wherein each of the plurality of fuel injection events takes part in the actual combustion of the fuel.

6. The method of claim 1, wherein the first fuel injection event and the second fuel injection event comprise approximately equal amounts of fuel.

7. The method of claim 1, wherein the first fuel injection event and the second fuel injection event comprise a ratio between a first fuel amount and a second fuel amount, the ratio having a value between 3:7 and 25:15 inclusive.

8. The method of claim 1, wherein the engine load level comprises one of an engine torque output request and an engine horsepower output request.

9. A method, comprising:
 determining whether an aftertreatment regeneration is active;
 determining a combustion fuel amount for an internal combustion engine including one or more reciprocating pistons;
 injecting the combustion fuel amount within a combustion cycle such that over 50% of the combustion fuel amount is injected more than 10 degrees after top dead center (TDC) of the one or more reciprocating pistons in response to the aftertreatment regeneration being active, wherein injecting the combustion fuel amount comprises performing a plurality of fuel injection events in the internal combustion engine, wherein each of the plurality of fuel injection events begin no later than 63 degrees after TDC;
 interpreting an engine load level, and in response to determining the engine load level is at least equal to 40% of a maximum engine load level: performing a first fuel injection event before 8 degrees after TDC comprising less than 50% of the combustion fuel amount, performing a second fuel injection event after 10 degrees after TDC comprising between 5% and 45% of the combustion fuel amount, and performing a third fuel injection event after the second fuel injection event comprising between 5% and 55% of the combustion fuel amount; and
 combusting the combustion fuel amount during the combustion cycle.

10. The method of claim 9, further comprising determining an engine torque output request, and adjusting the combustion fuel amount based on the timing and fuel amounts of the plurality of fuel injection events such that the internal combustion engine achieves the engine torque output request.

11. The method of claim 9, wherein the second fuel injection event occurs not earlier than 3 crank angle degrees after the first fuel injection event.

12. The method of claim 9, wherein each of the plurality of fuel injection events takes part in the actual combustion of the fuel.

13. The method of claim 9, wherein the first fuel injection event and the second fuel injection event comprise approximately equal amounts of fuel.

14. The method of claim 9, wherein the first fuel injection event and the second fuel injection event comprise a ratio between a first fuel amount and a second fuel amount, the ratio having a value between 3:7 and 7:3 inclusive.

15. A method, comprising:
 determining whether an aftertreatment regeneration is active;
 determining a combustion fuel amount for an internal combustion engine including one or more reciprocating pistons;
 injecting the combustion fuel amount within a combustion cycle such that over 50% of the combustion fuel amount is injected more than 10 degrees after top dead center (TDC) of the one or more reciprocating pistons in response to the aftertreatment regeneration being active, wherein injecting the combustion fuel amount comprises performing a plurality of fuel injection events in the internal combustion engine, wherein each of the plurality of fuel injection events begin no later than 63 degrees after TDC;
 interpreting an engine load level, and in response to determining the engine load level is at least equal to 40% of a maximum engine load level: performing a first fuel injection event having a timing before 10 degrees after TDC, and performing at least one post fuel injection event after the first fuel injection event, wherein each post fuel injection event occurs after 10 degrees after TDC, and wherein the sum of fueling amounts from the at least one post fuel injection events comprises over 50% of the combustion fuel amount; and
 combusting the combustion fuel amount during the combustion cycle.

16. The method of claim 15, further comprising determining an engine torque output request, and adjusting the combustion fuel amount based on the timing and fuel amounts of the plurality of fuel injection events such that the internal combustion engine achieves the engine torque output request.

17. The method of claim 15, wherein a first fuel injection event occurs before 10 degrees after TDC, and wherein a second fuel injection event occurs not earlier than 3 crank angle degrees after the first fuel injection event.

18. The method of claim 15, wherein a second fuel injection event occurs not earlier than 3 crank angle degrees after the first fuel injection event.

19. The method of claim 15, wherein each of the plurality of fuel injection events takes part in the actual combustion of the fuel.

20. The method of claim 15, wherein the first fuel injection event and a second fuel injection event comprise approximately equal amounts of fuel.

21. The method of claim 15, wherein the first fuel injection event and a second fuel injection event comprise a ratio between a first fuel amount and a second fuel amount, the ratio having a value between 3:7 and 7:3 inclusive.

22. A method, comprising:
 interpreting an engine load level for a reciprocating piston internal combustion engine;
 in response to determining the engine load level is less than a threshold percentage of a maximum engine load level:

performing a first fuel injection event comprising less than 25% of a combustion fuel amount, the first fuel injection event occurring before 10 degrees after top dead center (TDC);

performing a second fuel injection event comprising between 15% and 65% of the combustion fuel amount, the second fuel injection event occurring after 10 degrees after TDC; and performing a third fuel injection event comprising between 10% and 85% of the combustion fuel amount, the third fuel injection event occurring before 63 degrees after TDC.

23. The method of claim 22, wherein fuel injected in each fuel injection event takes part in the actual combustion of the fuel.

24. The method of claim 22, wherein each of the second and third fuel injection events follows the preceding fuel injection event by not less than 3 crank angle degrees.

25. The method of claim 22, further comprising:

in response to determining the engine load level is at least equal to the threshold percentage of the maximum engine load level:

performing a fourth fuel injection event comprising not more than 60% of a combustion fuel amount, the fourth fuel injection event occurring before 8 degrees after top dead center (TDC);

performing a fifth fuel injection event comprising between 5% and 45% of the combustion fuel amount, the fifth fuel injection event occurring after 10 degrees after TDC; and performing a sixth fuel injection event comprising between 5% and 55% of the combustion fuel amount, the sixth fuel injection event occurring at least 3 degrees after the fifth fuel injection event and before 63 degrees after TDC.

26. The method of claim 22, further comprising:

in response to determining the engine load level is at least equal to the threshold percentage of the maximum engine load level:

performing a fourth fuel injection event and a fifth fuel injection event, wherein the fourth fuel injection event comprises less than 60% of the combustion fuel amount and occurs before 10 degrees after TDC, and wherein the fifth fuel injection event occurs after 10 degrees after TDC.

27. The method of claim 22, wherein the threshold percentage comprises 30%.

28. The method of claim 22, wherein the threshold percentage comprises 40%.

* * * * *